L. C. McCARTNEY.
HOG WATERER.
APPLICATION FILED JAN. 24, 1919.
1,341,919.
Patented June 1, 1920.
2 SHEETS—SHEET 2.
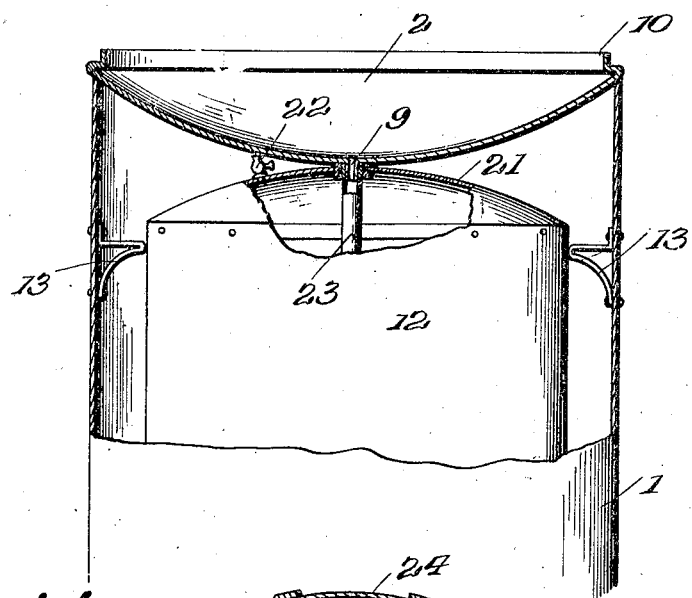
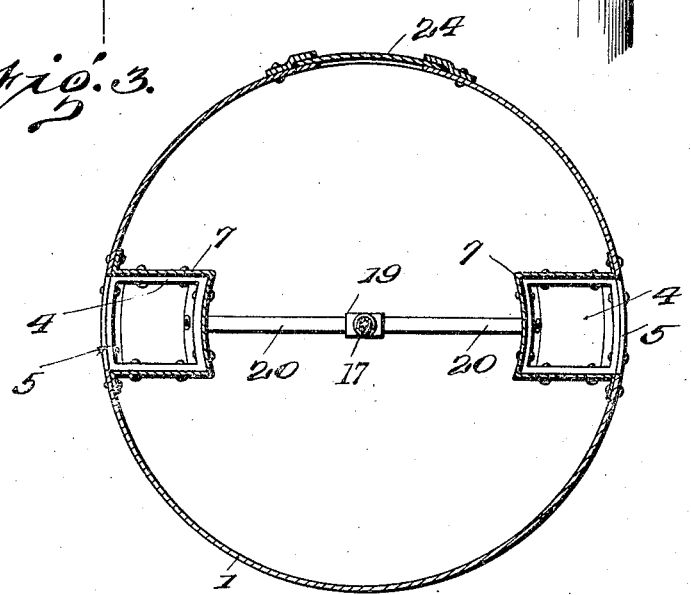
Inventor
L. C. McCartney.
By Lacey & Lacey, Attorneys

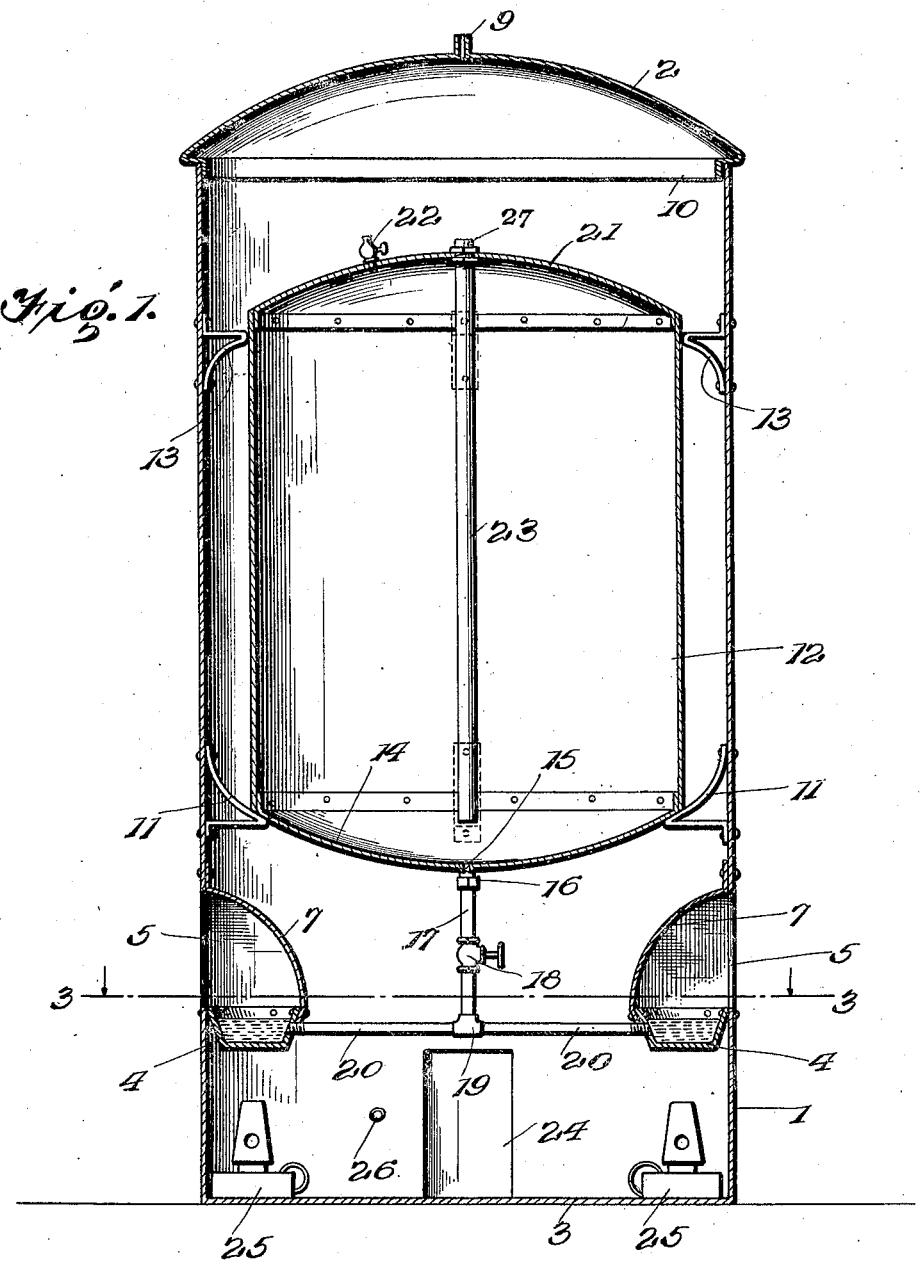

UNITED STATES PATENT OFFICE.

LESLIE CAIUS McCARTNEY, OF LINCOLN, NEBRASKA.

HOG-WATERER.

1,341,919.          Specification of Letters Patent.      Patented June 1, 1920.

Application filed January 24, 1919. Serial No. 272,876.

*To all whom it may concern:*

Be it known that I, LESLIE CAIUS MC-CARTNEY a citizen of the United States, residing at Lincoln, in the county of Lancaster and State of Nebraska, have invented certain new and useful Improvements in Hog-Waterers, of which the following is a specification.

This invention relates to apparatus for supplying drinking water to hogs and similar small animals and has for its object the provision of efficient means whereby the water will be maintained at the proper temperature for drinking and to simplify the construction of the apparatus so that the cost of production will be minimized without any reduction in its efficiency. The invention is illustrated in the accompanying drawings and consists in certain novel features which will be particularly pointed out in the claim following a detailed description.

In the drawings—

Figure 1 is a vertical section of a fountain embodying my invention;

Fig. 2 is a similar view of the upper portion of the apparatus showing the manner of arranging the parts to facilitate the filling of the tank;

Fig. 3 is a horizontal section on the line 3—3 of Fig. 1.

In carrying out my invention, I employ a casing which consists of a base portion 1 and a cover 2. The casing is preferably cylindrical in plan view although, of course, it may be of any other desired configuration and is intended to rest upon the ground and may be provided with a bottom plate 3 if so desired. Within the casing, I secure to the wall thereof, by any convenient means, a trough or a plurality of troughs 4 and above each trough an opening 5 is formed in the wall of the casing to permit an animal to insert his head in order to drink. From the walls of each trough a hood 7 rises, the inner wall or side of the hood being carried outwardly to the shell or casing, as shown clearly in Fig. 1, the trough being thus effectually covered so that foreign objects cannot be easily dropped into the water to contaminate the same. The shell or casing may extend upwardly to any desired height and its upper end is open but adapted to be closed by the cover 2 which is convex or arcuate, as clearly shown, and is provided at its center with a nipple 9. The cover is provided with a depending rim 10 which is adapted to fit within the upper end of the shell and thereby properly center the cover with respect to the shell.

On the inner surface of the shell, I provide a plurality of brackets 11 which serve to support the tank 12 and also similar or slightly smaller brackets 13 which are adapted to engage the tank and maintain it in its proper concentric relation to the shell. The upper brackets 13, as clearly shown in Figs. 1 and 2, bear against the side of the tank below the upper end of the same and these brackets may be of any convenient construction. While the particular number of the brackets is not essential, I usually employ four brackets spaced equidistantly around the shell. The lower brackets 11 are provided with curved or concave upper surfaces which form seats upon which the lower convex end 14 of the tank may rest, as clearly shown in Fig. 1, so that the tank will be firmly supported and expensive securing devices will not be needed. The lower end of the tank is dished or tapered so that the water will be directed toward the center of the same and will be thoroughly drained so that there can be no accumulation of stagnating water or germ-breeding matter in the tank. At the lowest point of the end or head 14 of the tank is an outlet nipple 15 which is connected by a union 16 with the outlet pipe 17, said pipe being equipped with a cut-off valve 18. At the lower end of the pipe 18 is a coupling 19 from which a branch or branches 20 lead to the respective troughs and into the same through the inner wall thereof, the outlets of the pipes being preferably arranged near the bottoms of the troughs so that when in use the water in a trough will form an effectual seal therefor and overflowing of the trough will be avoided. The upper end of the tank is closed by an arched head 21 in which, near the center thereof, is a vent 22 so that, when the tank is being filled, any air which may be contained therein may escape and consequently the tank will not contain any surplus air and overflowing of the trough will be prevented. From the central point of the head 21 a filling pipe 23 extends downwardly within the tank and terminates near but above the lower end thereof.

The casing is constructed with a suitable door 24 so that access may be had to the cut-off valve 18 and also to lamps or other forms of heaters 25 which are placed within the casing, as shown, so that the heat therefrom will play upon the bottoms of the troughs and thereby prevent freezing of the water. A small opening 26 is provided through the wall of the casing to admit sufficient air to support combustion in the heaters and maintain a gentle circulation.

When the tank is to be filled the door 24 is opened and the cut-off valve 18 is closed. The cover is then removed from the casing and inverted so that the nipple 9 may be engaged in the upper end of the filling pipe 23, as shown in Fig. 2, the vent 22 being open as will be readily understood. The cover when arranged as shown in Fig. 2, will serve as a funnel in which water may be poured and by which it will be directed into the filling pipe 23 without any waste. It will be noted that the parts are so proportioned that the inverted cover will be supported by the casing with the nipple 9 entering the pipe 23 but without choking the vent 22. As the water rises in the tank, the air trapped in the tank will escape through the vent 22 and consequently there will be no pressure exerted on the water to force it through the outlet pipes and cause overflow of the trough. After the tank has been filled, the cover 2 is returned to its normal position shown in Fig. 1, and a plug or stopper 27 is fitted in the upper end of the filling pipe. The cut-off valve 18 is then opened and adjusted as may be desired. The water will then flow into the trough until it reaches a level which will cause it to seal the ends of the branch pipes 20. If the weather be mild, the heaters 25 need not be utilized and the air around the tank and between the same and the casing will serve to keep the drinking water at a proper temperature for drinking but if the weather should be cold the heaters may obviously be set in operation and the heated air rising therefrom will then circulate through the air space within the casing and around the tank so that the water will be prevented from freezing and will be kept at a proper temperature for drinking, the nipple 9 providing a vent to avoid overheating. It will be readily noted that there are no floats or similar devices employed in this fountain to control the flow of water which is fed by gravity as the supply in the trough is consumed so that a certain quantity of water will be automatically supplied to the trough as long as there is any water contained in the tank. The brackets on the inner side of the casing support the tank firmly and maintain it in proper spaced relation to the shell so that an air space is provided around the tank to protect the water therein against freezing in cold weather and also to prevent heating of the same in warmer weather. The form of the lower end of the tank directs all water therein to the outlet pipe so that all the water may be drained from the tank and the formation of rust and accumulation of disease germs will be avoided. The arched formation of the upper end of the tank also is advantageous inasmuch as it directs all the trapped air to the vent when the tank is being filled and, therefore, overcomes any tendency to overflowing in the trough. The cut-off valve 18 avoids the necessity of supplying closures for the outlets of the branch pipes 20 when the tank is being filled and thereby saves labor and inconvenience which has been heretofore experienced in withdrawing such closures from the troughs in freezing weather. The coupling 16 facilitates the removal of the tank when it is necessary to clean the apparatus or repair the same inasmuch as the dimensions of the several parts are such that this coupling may be easily reached through the door 24 and after the coupling has been disconnected the tank may be lifted through the upper end of the casing. As the trough is shallow and has flared walls it may be easily and thoroughly cleaned without requiring the placing of the hands in the water.

Having thus described my invention, what is claimed as new is:

An apparatus for the purpose set forth comprising a substantially cylindrical casing, a trough in the lower portion of the casing and supported by the wall of the same, a substantially cylindrical tank in the casing above the trough having a vent in its upper end and having a concave lower end, a valved outlet pipe leading from the lowest point of the lower end of the tank into and through the side of the trough, the upper end of said outlet pipe being removably secured to the tank, a filling pipe secured at its upper end in the top of the tank and having its lower end within the tank and spaced from the bottom of the same, and an arched cover for the casing having a central nipple normally forming an air outlet for the casing and adapted to engage in the upper end of the feed pipe when the cover is inverted, the cover being supported by the upper end of the casing in both its normal and its inverted positions and the tank being spaced throughout its extent from the casing.

In testimony whereof I affix my signature.

LESLIE CAIUS McCARTNEY. [L. s.]